(12) United States Patent
Sunay et al.

(10) Patent No.: US 6,353,626 B1
(45) Date of Patent: Mar. 5, 2002

(54) METHODS AND APPARATUS FOR PROVIDING NON-UNIFORM DE-MULTIPLEXING IN A MULTI-CARRIER WIDE BAND CDMA SYSTEM

(75) Inventors: Oguz Sunay, Morris Plains, NJ (US); Jussi Kahtava, Tokyo (JP)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/072,217

(22) Filed: May 4, 1998

(51) Int. Cl.$^7$ .......................... H04L 27/30; H04B 7/216
(52) U.S. Cl. ....................................... 375/130; 370/335
(58) Field of Search ................................. 375/130, 146, 375/131; 370/335, 342, 468; 455/442, 436

(56) References Cited

U.S. PATENT DOCUMENTS

| 5,440,597 A | 8/1995 | Chung et al. ............... 375/200 |
| 5,442,625 A | 8/1995 | Gitlin et al. ................... 370/18 |
| 5,491,718 A | 2/1996 | Gould et al. ................. 375/205 |
| 5,548,616 A | 8/1996 | Mucke et al. ............... 375/295 |
| 5,566,201 A | 10/1996 | Ostman ....................... 375/200 |
| 5,859,840 A | * 1/1999 | Tiedemann, Jr. et al. ... 370/335 |
| 5,963,548 A | * 10/1999 | Virtanen ...................... 370/335 |
| 6,064,663 A | * 5/2000 | Honkasalo et al. ......... 370/335 |
| 6,101,168 A | * 8/2000 | Chen et al. .................. 370/228 |
| 6,160,803 A | * 12/2000 | Yuen et al. .................. 370/342 |

* cited by examiner

*Primary Examiner*—Chi Pham
*Assistant Examiner*—Khai Tran
(74) *Attorney, Agent, or Firm*—Perman & Green, LLP

(57) ABSTRACT

A wireless telecommunications system that includes at least one base station, at least one mobile station, and a data distribution system in the base station for non-uniformly distributing data amongst a plurality of subchannels that are overlaid upon underlying channels before transmission of the plurality of subchannels to the mobile station. The data distribution system non-uniformly distributes the data in accordance with a total load that is already present in each of the subchannels due to the presence of the underlying channels.

16 Claims, 4 Drawing Sheets

METHODS AND APPARATUS FOR PROVIDING NON-UNIFORM DE-MULTIPLEXING IN A MULTI-CARRIER WIDE BAND CDMA SYSTEM

FIELD OF THE INVENTION

This invention relates generally to radiotelephone systems and, in particular, to a radiotelephone system having multi-carrier, wideband code division multiple access (WCDMA) capability.

BACKGROUND OF THE INVENTION

A proposed IS-95 third generation (3G) radiotelephone system has a wideband, spread spectrum radio interface that uses CDMA technology. The system is expected meet all of the requirements for the next generation evolution of the current TIA/EIA-95-B family of standards. This includes providing support for the following: a wide range of operating environments (indoor, low mobility, full mobility, and fixed wireless); a wide performance range (from voice and low speed data to very high speed packet and circuit data services); and a wide range of advanced services (including voice only, simultaneous voice and data, data only, and location services). Support is also provided for an advanced Multimedia Quality of Service (QoS) Control capability supporting multiple concurrent voice, high speed packet data, and high speed circuit data services, along with sophisticated QoS management capabilities. A modular structure is proposed to support existing Upper Layer Signaling protocols as well as a wide range of future third generation Upper Layer Signaling protocols. The proposed system is also expected to provide a seamless interoperability and handoff with existing TIA/EIA-95-B systems, and to provide a smooth evolution from existing TIA/EIA-95-B based systems (including support for overlay configurations within the same physical channel as existing TIA/EIA-95-B systems.) The proposed system will also support highly optimized and efficient deployments in clear spectrum (in cellular, PCS, and IMT-2000 spectrum), and will offer support for existing TIA/EIA-95-B services, including speech coders, packet data services, circuit data services, fax services, Short Messaging Services (SMS), and Over the Air Activation and Provisioning.

Of particular interest to the teaching of this invention is an ability to provide N×1.25 MHz (N=1, 3, 6, 9, and 12) Multi-Carrier systems that can be deployed as an overlay on up to N 1.25 MHz TIA/EIA-95-B carriers. In this configuration the resulting system can concurrently provide both second generation and third generation services to second generation (TIA/EIA-95-B) and third generation (IS-95 3G) mobile stations. When operated in the overlay configuration the second and third generation systems share common pilot channels, and can optionally share common paging channels. The third generation spread spectrum system can also be deployed in another set of channels within the same or in a different frequency band.

In general, the IS-95 3G system provides the ability to coexist with TIA/EIA-95-B in the same frequency channel via the overlay configuration, as well as an ability to coexist with TIA/EIA-95-B systems in the same frequency band (e.g., cellular or PCS).

It is known in the art, in the multi-carrier or multi-channel context, that information symbols are transmitted or more specifically de-multiplexed uniformly. This is because the symbol transmission rate is the same for all the sub-carriers in the multi-carrier system. In such an arrangement, the overall performance of the spread spectrum overlay is limited by the most loaded subcarrier within the multi-carrier system.

It is also known in the art, in the multi-carrier context, that the information symbols can be transmitted based on a base transmission rate and multiples of the base rate. In such an arrangement, there is no formalized method of choosing symbol transmission rates, and no parameter values upon which the symbol transmission rates are formulated. The symbol transmission rates are numbers which are finite and discrete.

In these systems, the symbol transmission rate cannot be readily determined in a domain of rational numbers in a continuous manner.

OBJECTS AND ADVANTAGES OF THE INVENTION

It is a first object and advantage of this invention to non-uniformly distribute information signals amongst different channels in a multi-channel wireless communication system using a spread spectrum method.

It is a second object and advantage of this invention to determine a symbol transmission rate for each channel based upon each channel's parameters, which are a function of factors determined with and without transmitted information, respectively.

It is a third object and advantage of this invention to determine a symbol transmission rate continuously on a subset, interval, or domain of rational numbers.

It is a fourth object and advantage of this invention to determine and formalize a quantity which is independent of information symbols or signals transmitted within a multi-channel system.

It is a further object and advantage of this invention to determine and formalize a quantity which is dependent upon information symbols or signals transmitted within a multi-channel system.

SUMMARY OF THE INVENTION

The foregoing and other problems are overcome and the objects and advantages are realized by methods and apparatus in accordance with embodiments of this invention.

In one aspect this invention teaches a wireless telecommunications system that includes at least one base station, at least one mobile station, and a data distribution system in the base station for non-uniformly distributing data amongst a plurality of subchannels, that are overlaid upon one or more underlying channels, before transmission of the plurality of subchannels to the mobile station. The data distribution system non-uniformly distributes the data in accordance with a total load that is already present in each of the subchannels due to the presence of the underlying channels.

In a further aspect this invention teaches a multi-channel wireless communication system of a type that utilizes a first spread spectrum communication subsystem with one or more subchannels capable of co-existing with channels of a second spread spectrum communication subsystem. In a transmission station of the system there is provided a data distributor for distributing information signals non-uniformly amongst the subchannels based upon a plurality of criteria and, coupled to outputs of the data distributor, circuitry for spreading and transmitting the information signals to the plurality of subchannels. The plurality of criteria are comprised of a first noise-related factor $N_0$ and a second noise-related factor $N_{2G}$, wherein the first noise-related factor $N_0$ is independent of information signals transmitted within the overlaid channels, and wherein the second factor $N_{2G}$ relates to one subchannel and is dependent upon information signals transmitted within the overlaid channels.

In the preferred embodiment the first spread spectrum subsystem has wider transmission bandwidth than the second spread spectrum subsystem, and the plurality of subchannels have a set of carrier frequencies with bandwidth that either overlaps one another or that does not overlap one another.

The data distributor operates with a set of symbol transmission rates $f_i$ for an ith channel, which is dependent upon: a positive integer M which denotes a total number of subchannels, the first noise related factor $N_0$, a second factor $N_{2G}$ that pertains to the subchannel, and a desired total transmission rate r, in accordance with $$f_i = \frac{r \cdot \left(N_0 + \frac{1}{M-1} \sum_{j=1}^{M} N_{2G-j}\right)}{\left(M \cdot N_0 + \sum_{j=1}^{M} N_{2G-j}\right)}$$

wherein in the summation constituting part of the numerator, the j's do not include i.

The data distributor is controlled by a controller that operates with one of static criteria over an interval of time, or dynamic criteria that vary as the loading of the overlaid channels varies over an interval of time.

A spread spectrum code division multiple access wireless telecommunications system in accordance with this invention thus includes at least one base station, a plurality of mobile stations located in a region served by said at least one base station, and a data distribution system in the base station for non-uniformly distributing information bits to be transmitted amongst X first spread spectrum system channels. At least one of the X channels coexists with a second spread spectrum system channel. The data distribution system non-uniformly distributes the information bits in accordance with a first noise factor that is substantially independent of transmitted information bits and X second noise factors individual ones of which are associated with information bits being transmitted in one of said X first spread spectrum channels.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
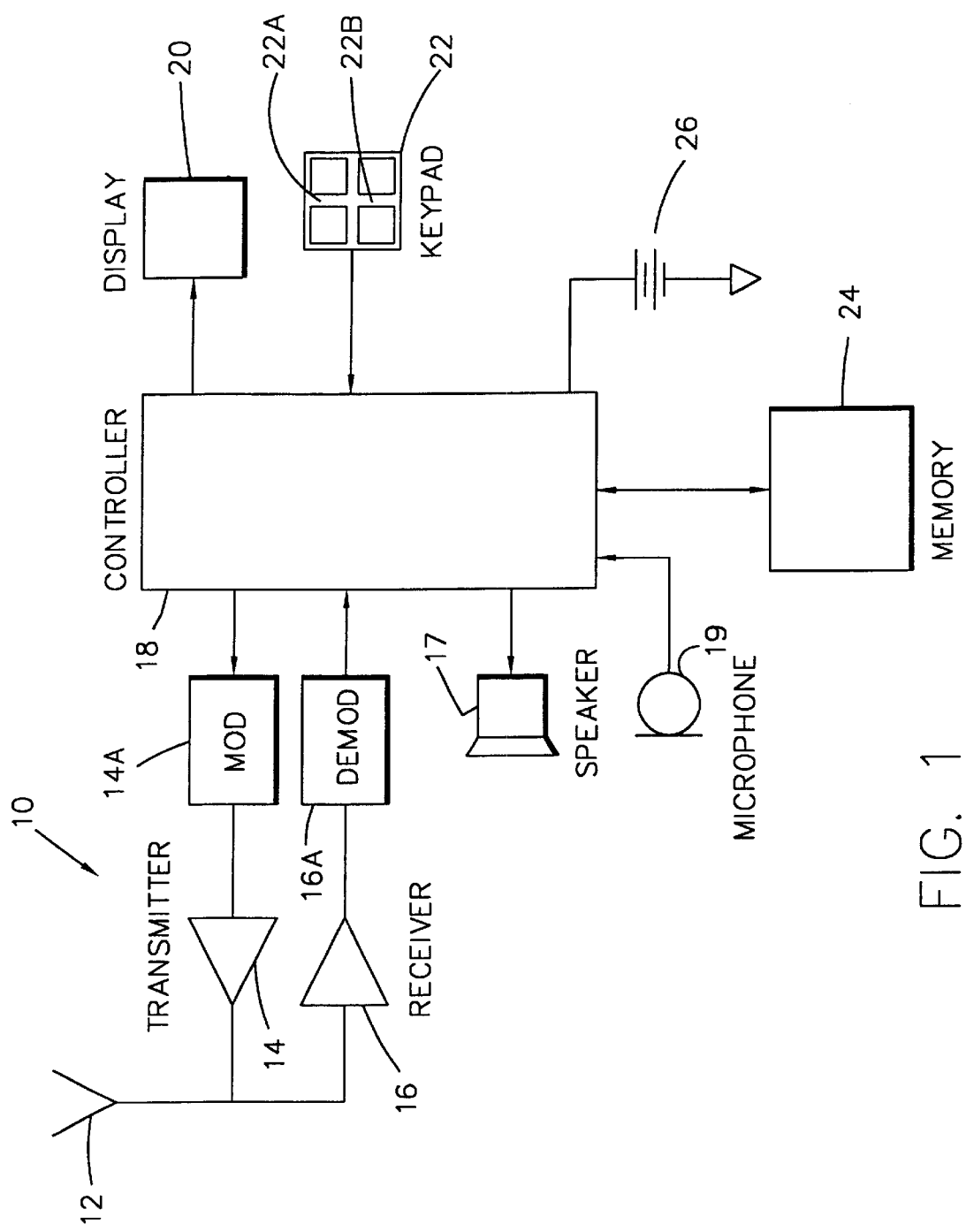
FIG. 1 is a block diagram of a CDMA mobile station that is suitable for use in practicing this invention.
Figure 2:
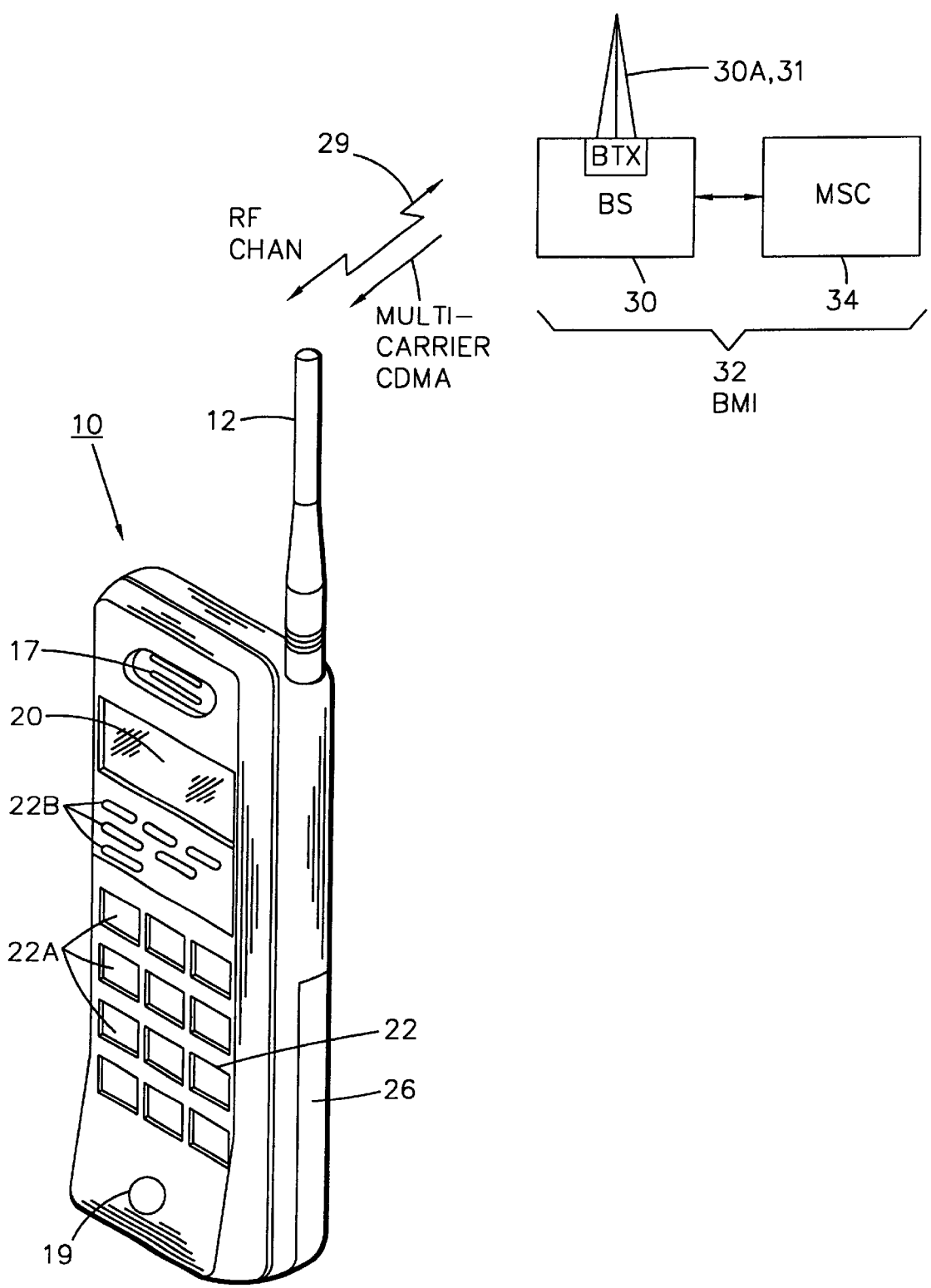
FIG. 2 is an elevational view of the mobile station shown in FIG. 1, and which further illustrates a CDMA communication system to which the mobile station is bidirectionally coupled through an RF channel.

Reference is made to FIGS. 1 and 2 for illustrating a wireless user terminal or mobile station 10, such as but not limited to a cellular radiotelephone or a personal communicator, that is suitable for practicing this invention. The mobile station 10 includes an antenna 12 for transmitting signals to and for receiving signals from a base site or base station 30 over an RF channel 29. The base station 30 is a part of a cellular network comprising a Base Station/ Mobile Switching Center/Interworking function (BMI) 32 that includes a mobile switching center (MSC) 34. The MSC 34 provides a connection to landline trunks when the mobile station 10 is involved in a call.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. The air interface standard is assumed for this invention to include a spread spectrum, code division multiple access (CDMA) air interface that is identical to or similar to the proposed third generation spread spectrum system discussed earlier, although the teaching of this invention is not intended to be limited only to this specific type of system, or for use only with an IS-95 type of mobile station, or for use only in spread spectrum systems.

Of particular interest to this invention is a multi-carrier forward link structure or sub-system 31 (shown in FIG. 5) that is used, in cooperation with a base station transmitter (BTX) 30a, to implement the teachings of this invention.

For the purposes of this invention it is assumed that the base station 30 is capable of transmitting N subchannels to the mobile station 10, and that the mobile station 10 is capable of separately despreading and demultiplexing the subchannels. The demodulator 16A may thus be a multi-finger decorrelator for separately despreading each subchannel using a different subchannel pseudonoise (PN) spreading code. Various decorrelators and decoders are known in the art, and will not be discussed with any specificity herein.

By example, reference may be had to the following commonly assigned U.S. Patents for teaching various aspects of spread spectrum circuitry and methods: U.S. Pat. No. 5,440,597 issued Aug. 8, 1995 by S. Chung et al., entitled "Double Dwell Maximum Likelihood Acquisition System With Continuous Decision Making For CDMA And Direct Spread Spectrum System"; U.S. Pat. No. 5,566,201 issued Oct. 15, 1996 by K. Ostman, entitled "Digital AGC For A CDMA Radiotelephone"; U.S. Pat. No. 5,548,616 issued Aug. 20, 1996 by L. Mucke et al., entitled "Spread Spectrum Radiotelephone Having Adaptive Transmitter Gain Control"; and U.S. Pat. No. 5,491,718 issued Feb. 13, 1996 by A. Gould et al., entitled "CDMA Radiotelephone Having Optimized Slotted Mode And Long Code Operation". The disclosures of these commonly assigned U.S. Patents are incorporated by reference herein in their entireties to the extent that no conflict occurs with the teachings of this invention.

It is understood that the controller 18 also includes the circuitry required for implementing the audio and logic functions of the mobile station. By example, the controller 18 may be comprised of a digital signal processor device, a microprocessor device, and various analog to digital converters, digital to analog converters, and other support circuits. The control and signal processing functions of the mobile station are allocated between these devices according to their respective capabilities.

A user interface includes a conventional earphone or speaker 17, a conventional microphone 19, a display 20, and a user input device, typically a keypad 22, all of which are coupled. to the controller 18. The keypad 22 includes the conventional numeric (0–9) and related keys (#,*) 22a, and other keys 22b used for operating the mobile station 10. These other keys 22b may include, by example, a SEND key, various menu scrolling and soft keys, and a PWR key. The mobile station 10 also includes a battery 26 for powering the various circuits that are required to operate the mobile station.

The mobile station 10 also includes various memories, shown collectively as the memory 24, wherein are stored a plurality of constants and variables that are used by the controller 18 during the operation of the mobile station. For example, the memory 24 stores the values of various cellular system parameters and the number assignment module (NAM). An operating program for controlling the operation of controller 18 is also stored in the memory 24 (typically in a ROM device). The memory 24 may also store data, including user messages, that is received from the BMI 32 prior to the display of the messages to the user.

It should be understood that the mobile station 10 can be a vehicle mounted or a handheld device. It should further be appreciated that the mobile station 10 can be capable of operating with more than one air interface standard, modulation type, and access type.

Figure 3:
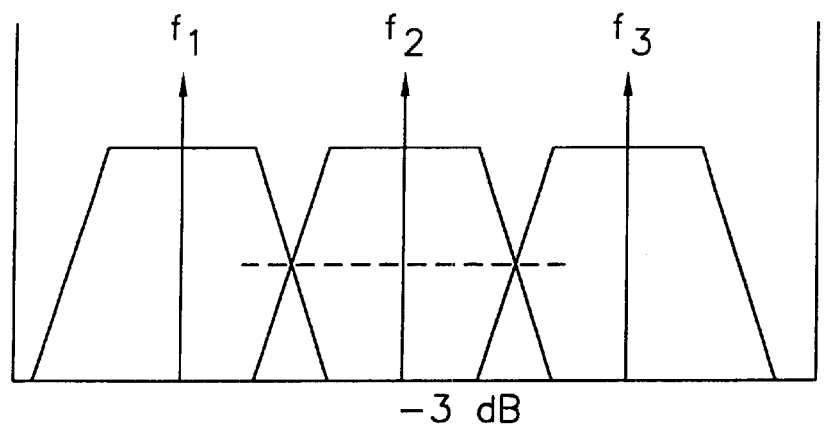
FIG. 3 is a graph that depicts multi-carrier system with adjacent or overlapping subcarriers.

FIG. 3 is a graph that depicts a multi-carrier system with adjacent or overlapping subcarrier bands of a multi-channel wireless communication system using the spread spectrum method of communication. In this example coded information symbols are transmitted on three (M=3) 1.25 MHz carriers, where each carrier is similar to an IS-95 carrier of 1.2288 MHz with a 3 dB bandwidth.

Figure 4:
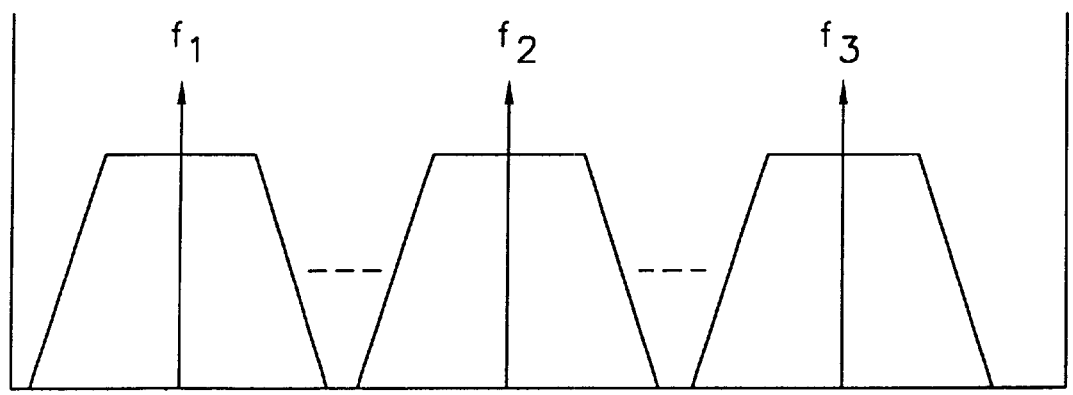
FIG. 4 is a graph that depicts a multi-carrier system with non-adjacent subcarriers.

FIG. 4 is a graph that depicts a multi-carrier system with M=3 non-adjacent subcarriers. The coded information symbols are transmitted on the three 1.25 MHz carriers, where each carrier is similar to an IS-95 carrier with the carrier frequency bands being spaced apart (non-overlapping).

The teachings of this invention find utility when using the overlapped or the non-overlapped carriers of FIGS. 3 and 4, respectively.

Figure 5:
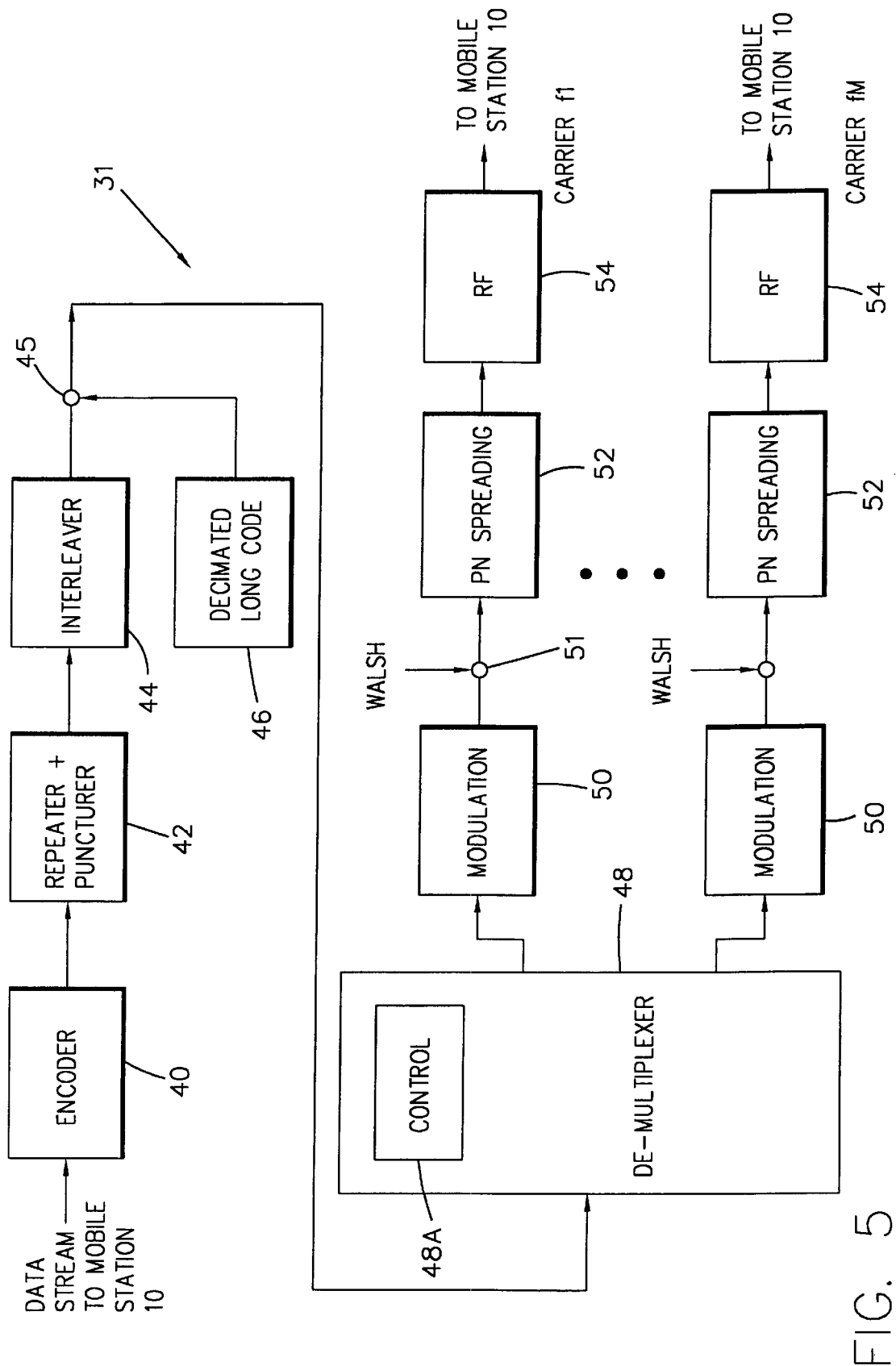
FIG. 5 is a block diagram of an embodiment of a base station forward link sub-system suitable for use in a third generation multi-carrier system using wideband code division multiple access (WCDMA) in accordance with the teachings of this invention.

FIG. 5 is a block diagram of the base station forward link structure 31 in the exemplary third generation multi-carrier system using wideband code division multiple access (WCDMA). The data are encoded by encoder 40, then repeated and punctured by repeater-and-puncturer 32, interleaved for burst error protection in the radio channel by interleaver 44, and thereafter spread in a spreader 45 with a decimated long code which serves as a privacy mask. The spread signals, which can be referred to as a stream of encoded bits, are then de-multiplexed amongst the M subcarriers. The encoded bits are applied to a de-multiplexer 48 which operates in accordance with this invention to distribute the encoded bits non-uniformly among the M subcarriers.

By way of an example, in the system some or all of the M subcarriers can be associated with a second generation (2G) cellular system using CDMA. In this case some of the subcarriers may have higher average loads than other subcarriers. If a third generation communication system overlay using WCDMA is desired, it is desirable to use the least loaded subcarrier the most, and the most loaded subcarrier the least. The third generation overlay, in accordance with an aspect of this invention, is thus accordingly overlaid according to the respective loads of the subchannels. Any 'in-between' load levels will necessarily fall between the levels of the minimum and maximum loaded subcarriers. Using this technique there is an improvement in performance of the third generation WCDMA system. This is true at least for the reason that due to the interference limitation on the symbol transmission rate, or the signal-to-noise ratio of each channel, the transmission rate for each channel is limited. Thus, transmission rates that are determined according to the load of each channel are desirable and serve to optimize the system capacity.

The limited nature of the channels in a conventional second generation system, such as an IS-95 system which may be overlaid by a third generation system, can be modelled using additive white Gaussian noise (AWGN). These noises include a first noise, which is independent of information symbols transmitted, and a second noise which is dependent on the information symbols transmitted in the second generation system.

For example, in a system with M subcarriers, i.e. $f_1, \ldots f_i, \ldots f_m$, there is a corresponding noise for each subcarrier, respectively denoted by $N_{2G-1}, \ldots N_{2G-i}, \ldots N_{2G-M}$. The above noises are dependent on the information signals transmitted in the M subcarriers and can be modelled as additive white Gaussian noise (AWGN). Furthermore, a common channel noise $N_0$ for each channel, which can be modelled as an additive white Gaussian noise (AWGN) as well, is introduced. This common channel noise is a quantity which is independent of any information signals transmitted in the M subcarriers. Thus, the total sum of AWGN seen by the third generation system, on each subcarrier, is respectively: $N_0+N_{2G-1}, \ldots N_0+N_{2G-i}, \ldots N_0+N_{2G-M}$.

In order to improve the performance of each of the M subcarriers, an overlaying third generation system in accordance with this invention de-multiplexes the information symbols into the subchannels in a manner that is inversely proportional to the total load already present in each of the subcarriers. A formula introduced according to this invention is as follows:

$$f_i = \frac{r \cdot \left(N_0 + \frac{1}{M-1} \sum_{j=1}^{M} N_{2G-j}\right)}{\left(M \cdot N_0 + \sum_{j=1}^{M} N_{2G-j}\right)}$$

where r is a total transmission rate, and in the summation constituting part of the numerator the j's do not include i.

Thus, the non-uniform de-multiplexer 48 in FIG. 5, according to this invention, operates in accordance with the foregoing formula to provide an optimal symbol transmission rate.

After de-multiplexing the information bit stream with the de-multiplexer 48, the information bits are distributed, according to this invention, non-uniformly upon the subcarrier channels $f_1$ to $f_M$. Each subcarrier channel has similar components. For example, the subcarrier channel for $f_1$ includes a modulator 50, a mixer 51 for mixing the information symbols with a Walsh code, a spreader 52 wherein the information symbols are spread with a pseudonoise (PN) code, and an RF block 54.

By way of a more specific example, assume that a multi-carrier system uses three subcarriers (M=3), and the three subcarriers are second generation systems which are similar to IS-95 CDMA system. Further assume that only one of the three subcarriers has a quantity which is dependent on the signals transmitted. Then: $N_{2G-1}=0$, $N_{2G-3}=0$; and $N_{2G-2}$ is non-zero. In this case, the de-multiplexer 48 will distribute the information symbols according to the following formulae:

$$\text{Symbol Transmission Rate for } f_1 = \frac{r \cdot \left(N_0 + \frac{1}{2} N_{2G-2}\right)}{3 \cdot N_0 + N_{2G-2})}$$

$$\text{Symbol Transmission Rate for } f_2 = \frac{r \cdot N_0}{3 \cdot N_0 + N_{2G-2})}$$

$$\text{Symbol Transmission Rate for } f_3 = \frac{r \cdot \left(N_0 + \frac{1}{2} N_{2G-2}\right)}{3 \cdot N_0 + N_{2G-2})}$$

It is noted here that the effect of the above factors can be modeled using AWGN in the preferred embodiment of this invention. However, any other suitable technique to model the wireless multi-channel spread spectrum communication system may be used. This invention applies in general to any wireless telecommunications system having a signal-to-noise ratio comprised of a first noise-related factor that is independent of signals transmitted, and a second factor dependent on signals transmitted.

The de-multiplexer 48 operates under the direction of a controller 48a that sets the values of the factors both dependent on and independent of the symbols transmitted. More specifically, the control of the de-multiplexer 48 can include a first static scheme, wherein the above mentioned dependent and independent factors (quantities), for example noise levels of each of the subcarrier of the second generation system, are pre-set for a predetermined period or time interval so as to ensure, for example, pre-set outage rates for a given number of second generation and third generation mobiles which share the same spectrum. Additionally, a second, dynamic control scheme can be used wherein the de-multiplexer 48 follows the dynamics of the loads of the second generation system, and arranges the flow of information symbols amongst the subcarriers in a time variant fashion. The base station 30 is assumed to have knowledge of the numbers of users and types of users in each of the channels, and can thus make the de-multiplexing decisions based on this knowledge. The base station 30 is also assumed to be capable of determining the intrinsic or inherent noise in the frequency channel(s) of interest.

The multi-channel wireless communication system of this invention can be portrayed as including two subsystems with one subsystem being overlaid onto the other subsystem, wherein one subsystem has a wider transmission bandwidth than the other. However, other arrangements can be used if desired. It is thus important to note that the teachings of this invention are not limited to a particular modulation technique, such as Multi-carrier W-CDMA. That is, the teachings of this invention are not constrained to be used with only this type of modulation technique, and should be given a wider interpretation and scope.

Thus, while the invention has been particularly shown and described with respect to preferred embodiments thereof, it will be understood by those skilled in the art that changes in form and details may be made therein without departing from the scope and spirit of the invention.

What is claimed is:

1. A wideband spread spectrum code division multiple access wireless telecommunications system, comprising:
   at least one base station;
   at least one mobile station; and
   a data distribution system in said base station for non-uniformly distributing data amongst a plurality of subchannels that are overlaid upon narrower bandwidth underlying channels before transmission of said plurality of subchannels to said mobile station, said data distribution system non-uniformly distributing the data in accordance with a total load that is already present in each of the subchannels due to the presence of the underlying channels.

2. A multi-channel wireless communication system of a type utilizing a first spread spectrum communication subsystem with a plurality of subchannels capable of being overlaid upon one or more channels of a second spread spectrum communication subsystem, comprising in a transmission station thereof:
   a data distributor for distributing information signals non-uniformly amongst said subchannels based upon a plurality of criteria; and
   coupled to outputs of said data distributor, circuitry for spreading and transmitting said information signals to said plurality of subchannels;
   wherein said plurality of criteria are comprised of a first noise-related factor $N_0$ and a plurality of second noise-related factors $N_{2G}$, wherein the first noise-related factor $N_0$ is independent of information signals transmitted within said overlaid channels, and wherein individual ones of the plurality of second factors $N_{2G}$ are dependent upon information signals transmitted within individual ones of said overlaid channels.

3. A multi-channel wireless communication system as in claim 2, wherein said first spread spectrum subsystem has a wider transmission bandwidth than said second spread spectrum subsystem.

4. A multi-channel wireless communication system as in claim 2, wherein said plurality of subchannels have a set of carrier frequencies with bandwidth overlapping one another.

5. A multi-channel wireless communication system as in claim 2, wherein said plurality of subchannels have a set of carrier frequencies with bandwidth that do not overlap one another.

$$f_i = \frac{r \cdot \left(N_0 + \frac{1}{M-1} \sum_{j=1}^{M} N_{2G-j}\right)}{\left(M \cdot N_0 + \sum_{j=1}^{M} N_{2G-j}\right)}$$

6. A multi-channel wireless communication system as in claim 2, wherein said data distributor is controlled by a controller that operates with static criteria over an interval of time.

7. A multi-channel wireless communication system as in claim 2, wherein said data distributor is controlled by a controller that operates with dynamic criteria that vary as the loading of said overlaid channels varies over an interval of time.

8. A multi-channel wireless communication system of a type utilizing a first spread spectrum communication subsystem with a plurality of subchannels capable of being overlaid upon one or more channels of a second spread spectrum communication subsystem, comprising in a transmission station thereof:
   a data distributor for distributing information signals non-uniformly amongst said subchannels based upon a plurality of criteria, wherein said data distributor operates with a set of symbol transmission rates $f_i$ for an ith channel, which is dependent upon: a positive integer M which denotes a total number of subchannels, said first noise related factor $N_0$, said second factors $N_{2G}$, and a desired total transmission rate r, in accordance with $$f_i = \frac{r \cdot \left(N_0 + \frac{1}{M-1} \sum_{j=1}^{M} N_{2G-j}\right)}{\left(M \cdot N_0 + \sum_{j=1}^{M} N_{2G-j}\right)}$$

wherein in the summation constituting part of the numerator, the j's do not include i; and coupled to outputs of said data distributor, circuitry for spreading and transmitting said information signals to said plurality of subchannels;

wherein said plurality of criteria are comprised of a first noise-related factor $N_0$ and a plurality of second noise-related factors $N_{2G}$, wherein the first noise-related factor $N_0$ is independent of information signals transmitted within said overlaid channels, and wherein individual ones of the plurality of second factors $N_{2G}$ are dependent upon information signals transmitted within individual ones of said overlaid channels.

9. A method for use in a multi-channel wireless communication system of a type utilizing a first spread spectrum communication subsystem with a plurality of subchannels capable of being overlaid upon channels of a second spread spectrum communication subsystem, comprising steps of:

distributing information signals non-uniformly amongst said subchannels based upon a plurality of criteria; and spreading and transmitting said information signals to said plurality of subchannels;

wherein said plurality of criteria are comprised of a first noise-related factor $N_0$ and said second noise-related factor $N_{2G}$, wherein the first noise-related factor $N_0$ is independent of information signals transmitted within said overlaid channels, and wherein the second factor $N_{2G}$ is dependent upon information signals transmitted within said overlaid channels.

10. A method as in claim 9, wherein said first spread spectrum subsystem has wider transmission bandwidth than said second spread spectrum subsystem.

11. A method as in claim 9, wherein said plurality of subchannels have a set of carrier frequencies with bandwidth overlapping one another.

12. A method as in claim 9, wherein said plurality of subchannels have a set of carrier frequencies with bandwidth that do not overlap one another.

13. A method as in claim 9, wherein said step of distributing operates with static criteria over an interval of time.

14. A method as in claim 9, wherein said step of distributing operates with dynamic criteria that vary as the loading of said overlaid channels varies over an interval of time.

15. A method for use in a multi-channel wireless communication system of a type utilizing a first spread spectrum communication subsystem with a plurality of subchannels capable of being overlaid upon channels of a second spread spectrum communication subsystem, comprising steps of:

distributing information signals non-uniformly amongst said subchannels based upon a plurality of criteria, wherein the step of distributing operates with a set of symbol transmission rates $f_i$ for an ith channel, which is dependent upon: a positive integer M which denotes denotes a total number of subchannels, said first noise related factor $N_0$, said second factor $N_{2G}$, and a desired total transmission rate r, in accordance with $$f_i = \frac{r \cdot \left(N_0 + \frac{1}{M-1} \sum_{j=1}^{M} N_{2G-j}\right)}{\left(M \cdot N_0 + \sum_{j=1}^{M} N_{2G-j}\right)}$$

wherein in the summation constituting part of the numerator, the j's do not include i; and spreading and transmitting said information signals to said plurality of subchannels;

wherein said plurality of criteria are comprised of a first noise-related factor $N_0$ and said second noise-related factor $N_{2G}$, wherein the first noise-related factor $N_0$ is independent of information signals transmitted within said overlaid channels, and wherein the second factor $N_{2G}$ is dependent upon information signals transmitted within said overlaid channels.

16. A spread spectrum code division multiple access wireless telecommunications system, comprising:

at least one base station;

a plurality of mobile stations located in a region served by said at least one base station; and a transmitted data distribution system in said base station for non-uniformly distributing information bits to be transmitted amongst X first spread spectrum system channels, at least one of said X channels coexisting with a second spread spectrum system channel, said data distribution system non-uniformly distributing the information bits in accordance with a first noise factor that is substantially independent of transmitted information bits and X second noise factors individual ones of which are associated with information bits being transmitted in one of said X first spread spectrum channels.

* * * * *